(12) United States Patent
Nguyen (10) Patent No.: US 12,245,000 B2
(45) Date of Patent: Mar. 4, 2025

(54) PIEZOELECTRIC TRANSDUCER AND FLAT PANEL SPEAKER WITH IMPROVED FREQUENCY RESPONSE AND METHOD OF MANUFACTURE

(71) Applicant: FLORA INNOVATIONS INC., Dover, DE (US)

(72) Inventor: Tung Thanh Nguyen, San Jose, CA (US)

(73) Assignee: FLORA INNOVATIONS INC., Dover, DE (US)

( * ) Notice: Subject to any disclaimer, the term of this patent is extended or adjusted under 35 U.S.C. 154(b) by 0 days.

(21) Appl. No.: 18/674,843

(22) Filed: May 25, 2024

(65) Prior Publication Data

US 2024/0397268 A1    Nov. 28, 2024

Related U.S. Application Data

(60) Provisional application No. 63/530,690, filed on Aug. 3, 2023, provisional application No. 63/469,390, filed on May 27, 2023.

(51) Int. Cl.
   *H04R 17/10*     (2006.01)
   *H04R 1/02*      (2006.01)
   *H04R 7/04*      (2006.01)

(52) U.S. Cl.
   CPC ............ *H04R 17/10* (2013.01); *H04R 1/028* (2013.01); *H04R 7/045* (2013.01); *H04R 2440/01* (2013.01); *H04R 2499/15* (2013.01)

(58) Field of Classification Search
   CPC ............ H04R 17/00; H04R 2201/003; H04R 2201/023; H04R 2217/03; H04R 29/001; H04R 3/04; G10K 11/004; G10K 11/02; G10K 9/122; H04B 1/005; H04B 1/0458; H04B 1/40
   USPC ......................................... 381/333, 322, 324
   See application file for complete search history.

(56) References Cited

U.S. PATENT DOCUMENTS

| | | | | |
|---|---|---|---|---|
| 6,140,740 | A * | 10/2000 | Porat | G01F 1/72 310/365 |
| 7,662,653 | B2 * | 2/2010 | O'Brien | B81B 7/007 438/107 |
| 2010/0094105 | A1 * | 4/2010 | Porat | A61K 9/0009 310/322 |
| 2013/0270967 | A1 * | 10/2013 | Dausch | H10N 30/2047 310/365 |
| 2015/0358740 | A1 * | 12/2015 | Tsai | G01N 29/36 73/632 |
| 2022/0314274 | A1 * | 10/2022 | Meynier | B06B 1/06 |
| 2024/0024916 | A1 * | 1/2024 | Kraft | G10K 9/122 |

* cited by examiner

*Primary Examiner* — Lun-See Lao
(74) *Attorney, Agent, or Firm* — Flagship Patents; Sikander M. Khan; Ken Milik (57) ABSTRACT

A transducer comprises two piezoelectric layers attached to a substrate, two protective layers, two masses, and two stiffeners arranged at the ends of the bimorph. The transducer is made using a composite bagging process and autoclave curing. The transducer is attached to a flat panel using a parallelogram-shaped double-sided tape to form a loudspeaker or a display panel with haptic feedback. The improved transducer enables a full-range flat panel speaker with uniform frequency response over its operating frequency.

11 Claims, 6 Drawing Sheets

PIEZOELECTRIC TRANSDUCER AND FLAT PANEL SPEAKER WITH IMPROVED FREQUENCY RESPONSE AND METHOD OF MANUFACTURE

PRIORITY DATA

This present application claims priority to and benefit of US Provisional Patent Application No. 63,469,390 filed May 27, 2023, and US Provisional Patent Application No. 63,530,690 filed Aug. 3, 2023, the entire contents of which are incorporated herein by reference.

FIELD OF THE TECHNOLOGY DISCLOSED

The present technology disclosed relates to a piezoelectric bending transducer, which generates sound or haptic feedback by exciting a thin panel.

BACKGROUND OF THE TECHNOLOGY DISCLOSED

Electrodynamic or cone speakers generate electromagnetic fields which vibrate a diaphragm in response to an audio-modulated electrical signal. Electrodynamic speakers have excellent dynamic frequency response, but they are bulky, heavy, and inefficient. They require special enclosures, often with multiple speakers to improve bass and treble response, to reproduce sounds at different frequency ranges. In addition, electrodynamic speakers have high power consumption and limited listening angle because of their directionality.

Flat panel speakers use an exciter to vibrate a flat panel to produce sound, distinguishing them from traditional electrodynamic speakers. Flat panel speakers may employ various technologies including ribbon, electrostatic, and piezoelectric transducers. Electrodynamic speaker elements may also be coupled to a flat panel, so that the flat panel vibrates to project sound. This configuration addresses the problem directionality and limited listening angle associated with electrodynamic speakers; however, flat panel speakers based on electrodynamic speaker elements are heavy and bulky with high electric power requirements.

In flat panel speakers, an acoustic exciter coupled to a panel vibrates the panel and shapes the acoustic performance of the speaker. Many flat panel technologies exhibit good mid-range frequency response. However, they often lack adequate base response, which is particularly noticeable with a 5W exciter on a small panel. The resonance frequency may not be sufficiently low, which hinders its ability to deliver satisfactory low-frequency response.

Adjusting the stiffness of the panel can help reduce the resonance frequency, but excessive adjustments may adversely affect high-frequency response. Panel size also affects base response. Larger and thicker panels provide better mechanical coupling with the exciter, lowering the resonance frequency and extending the frequency response to the lower end.

Sound pressure level (SPL) is the pressure level of a sound, measured in decibels (dB). Or, in other words, SPL is the ratio of the absolute sound pressure against a reference level of sound in the air. It has been shown that non-flat Sound Pressure Level (SPL) curves with dips and peaks, particularly in the low-frequency range, indicate the presence of panel resonance.

Optimizing the panel's shape and the attachment location of the exciter are crucial in minimizing these effects. Achieving optimal acoustic performance requires optimization of the exciter and the panel characteristics. When constructed with lightweight materials such as foam board panels, they can exhibit high sensitivity compared with electrodynamic speakers, allowing them to fill larger spaces with sound even with a small 5W amplifier.

One drawback of flat panel speakers is a limited response in very low less than 100 Hz and very high frequency ranges greater than 15 kHz. However, these problems can be eliminated by optimizing the structural characteristics of the exciter.

Some known loudspeaker types are described, for example, in U.S. Pat. Nos. 8,989,412; 10,409,325; 10,986,446; 11,115,740; and 11,120,713. Other loudspeaker types are described in US Pat. Publication Nos. US20030202672; US20160337758; US20210006744; and US20220182766. Additional loudspeaker types are described in U.S. Pat. Nos. 6,885,753; 7,684,576; 7,916,880; 10,924,866; 6,215,884, and Japanese Patent Publication JP 2008-48312 A.

There is clearly a need for a piezoelectric flat panel speaker that overcomes the deficiencies of traditional electrodynamic speakers and electrodynamic flat panel speakers. There is clearly a need for a piezoelectric flat panel speaker that includes an improved piezoelectric transducer for use as an acoustic exciter in a flat panel speaker. There is a further need for a flat panel speaker using an improved piezoelectric transducer with uniform frequency response, especially in low-frequency range. Furthermore, there is a further need for an improved flat panel speaker using a piezoelectric transducer which is easily manufactured and easily installed with numerous types of flat panels.

SUMMARY

The disclosed technology is a piezoelectric transducer which may be used to as an acoustic exciter to drive a flat panel speaker system produce a high-fidelity audio signal while providing ease of manufacture. In one aspect, a flat panel speaker has applications in rooms, computers, electronic equipment, and OLED panels and displays. In another aspect, a flat panel speaker is provided for use in vehicles such as automobiles, buses, aircraft, or other vehicle types.

The disclosed technology includes a stacked piezoelectric transducer assembly. In one aspect, the transducer may be manufactured with a thin profile in the range of 2 mm or 3 mm. The flat panel speakers are lightweight and highly efficient with simple driver circuits and minimal power consumption.

In one implementation, the disclosed technology is a piezoelectric transducer for use in multiple acoustic applications. In one implementation, the piezoelectric transducer may provide haptic feedback through a flat panel.

In another implementation, a flat panel speaker system is provided that provides improved uniform frequency response. Frequency response in the low range, below 300 Hz, is greatly improved. The frequency response exhibits more variations (peaks and dips) than found with loudspeakers using electromagnetic transducers, and overcomes the disadvantages of speakers using electromagnetic transducers, which have poor or non-uniform frequency response.

In one aspect of the present technology, a piezoelectric transducer is provided having a unique stacked structure. The electrodes are stacked one on top of another, covered by two protective layers. This stacked structure is then cured in an industrial autoclave. This method produces electrodes pressed together and electrically connected. This fabrication process facilitates mass manufacturing.

In another aspect of the present technology, two masses are added to peripheral edges of the piezoelectric transducer, extending the frequency response into the low-frequency range. In a further aspect, stiffeners are provided between the piezoelectric layers and the masses. This ensures a smooth transition of bending stiffness between the layers and the masses, which eliminates peaks and dips, thus improving frequency response in the low frequency range.

In a further aspect of the present technology, the piezoelectric transducer is attached to the flat panel by means of an adhesive member such as double-sided tape. Alternative adhesive methods and compositions may be used. Different shapes of the adhesive between the transducer and the panel may be provided. Alternative adhesive shapes extend lengthwise to the edges of the transducer, in the direction of the longer edge of the transducer. In another aspect, this unique structure of adhesive in various adhesive shapes attenuate resonance of the transducer in mid-range frequencies. The resulting piezoelectric transducer provides a full-range piezoelectric flat panel speaker with uniform frequency response.

BRIEF DESCRIPTION OF THE DRAWINGS

A complete understanding of the present technology disclosed may be obtained by reference to the accompanying drawings, when considered in conjunction with the subsequent detailed description, in which.

DETAILED DESCRIPTION

Figure 1A:
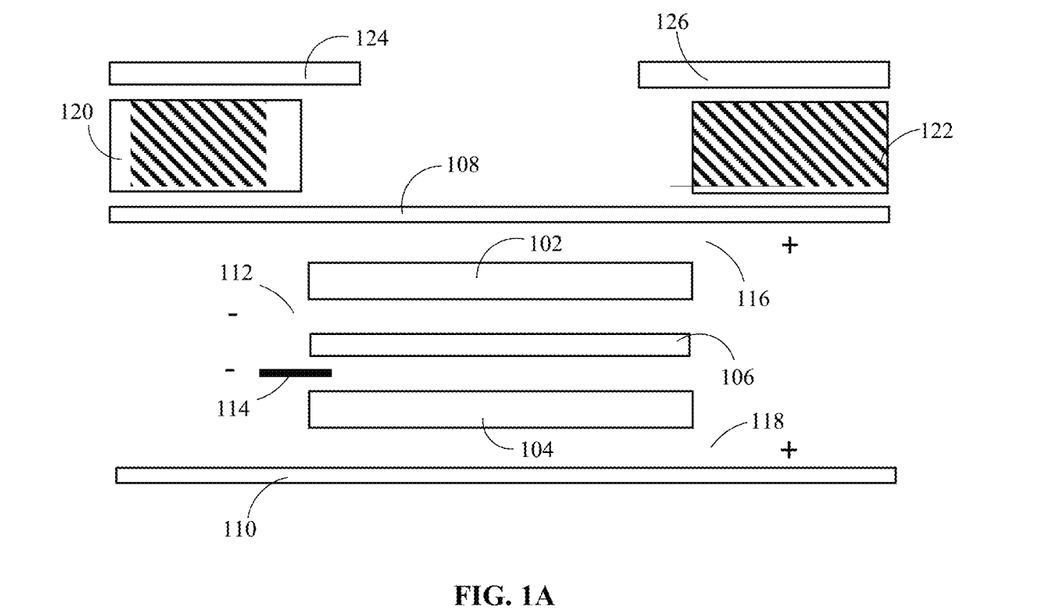
FIG. 1A is a cross sectional view of a stacked structure of a piezoelectric transducer according to this technology disclosed.
Figure 1B:
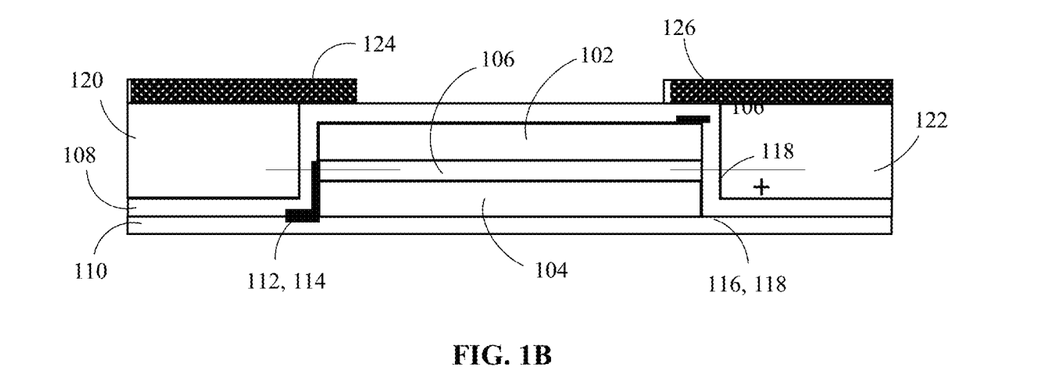
FIG. 1B is a cross sectional view of the transducer of FIG. 1A after the curing process.

The structure of a piezoelectric transducer according to the disclosed technology is illustrated in FIG. 1A and FIG. 1B, showing the unique stacked structure. The transducer 100 includes two active piezoelectric layers 102, 104 attached to the two opposite surfaces of a thin substrate 106 having approximately the same size. The piezoelectric layers 102, 104 have the same polarization direction. They can be made of PZT ceramic (lead zirconate titanate), although other substrate materials are contemplated.

Two protective layers 108, 110 are arranged one at the top and one at the bottom of the piezoelectric layers 102, 104, respectively. The protective layers 102, 110 extend beyond the length of the piezoelectric layers 102, 104. Between the piezoelectric layers 102, 104 are two electrodes 112, 114. Between the piezoelectric layers 102, 104 and the protective layers 108, 110 are another pair of electrodes 116, 118. The electrodes 112, 114, and 116, 118 may be fabricated from thin strips or foils of copper, aluminum, or carbon graphite. The electrodes 112, 114, and 116, 118 may be arranged on the same end or on different ends of the piezoelectric layers 102, 104. Alternatively, electrodes 112, 114 and 116, 118 may be formed as a single continuous strip.

The substrate and protective layers 106, 108, 110 can be made of an epoxy, polyimide, or composite fabric (e.g., carbon, Kevlar or glass fiber mixed with uncured epoxy). Two masses 120, 122 are positioned at two ends of the transducer 100.

Stiffeners have the purpose of providing rigidity to the structure as well as shaping the dynamic response of the transducer. Two stiffeners 124, 126 are arranged on the top of the masses 120, 122. Alternatively, the stiffeners can be positioned between the masses 120, 122 and the top protective layer 108.

The stiffeners 124, 126 have a small overlap with the piezoelectric layers 102, 104. This small overlap ensures that the transducer has bending stiffness with a smooth transition between the piezoelectric layers 102, 104 and the masses 120, 122. The masses 120, 122 may be fabricated from a heavy material such as steel, copper, or ceramic. The stiffeners 124, 126 may be fabricated from a fiber fabric, such as unidirectional carbon, Kevlar, or glass fiber, mixed with uncured epoxy.

Using an industrial autoclave system, the entire stacked structure is then cured at high temperature (180-200 degrees C.) under vacuum condition for four to six hours using a composite bagging process. The curing temperature of the stacked structure is then slowly ramped down to ambient temperature, whereby the epoxy resets and integrally bonds the stacked layers together as shown in FIG. 1B.

Autoclave curing of composites applies a combination of vacuum and external pressure. The vacuum removes air as well as volatiles trapped within a laminate, and the external pressure suppresses any remaining vapors into the resin matrix to prevent void formation. One of the several benefits of using an autoclave curing process is that it can produce large volumes, making it ideal for large-scale manufacturing runs. It also offers a great deal of precision, making it ideal for custom parts production.

Autoclave curing makes it possible to produce very strong, uniform components, especially relative to their weight. Autoclave-cured parts also are more resistant to chemical or heat damage. This makes them ideal for marine, aerospace, or industrial applications.

The electrodes 112, 114 are pressed against each other creating electrical connection between them. Electrode 116 is electrically connected to electrode 118 in the same manner. When a voltage signal is applied to the electrodes 112, 114, and 116, 118, opposite electric fields are applied across the piezoelectric layers 102, 104, causing expansion or contraction of the layers, depending on the polarity of the electric fields. When layer 102 contracts and layer 104 expands, and vice versa, this induces bending motion and vibration in the transducer 100.

In one implementation, the transducer 100 is a bimorph actuator which includes two piezoelectric layers. Alternatively, it can be a multi-morph actuator, which includes more than two piezoelectric layers, e.g., four, six layers, constructed using the same principle.

Figure 2A:
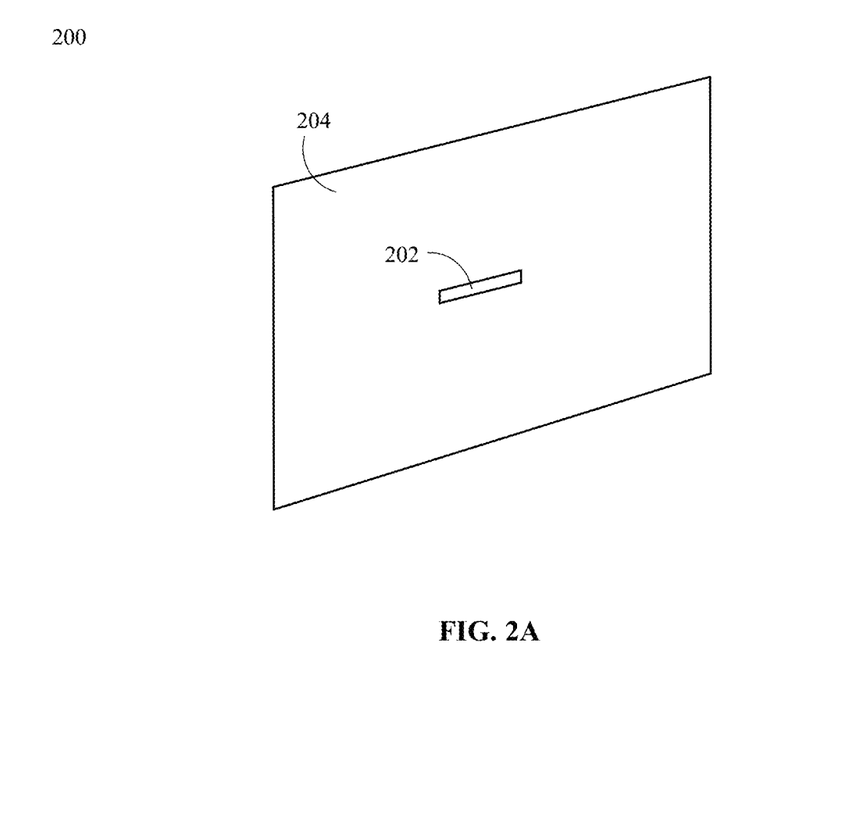
FIG. 2A is a perspective view of a flat panel speaker using the transducer of FIG. 1A.

Turning now to FIG. 2A, a flat panel speaker is illustrated that uses the transducer illustrated in FIG. 1B. The flat panel speaker is in the form of a lightweight thin panel 204, providing a mounting surface for attaching piezoelectric transducer or multiple transducers. The panel is preferably a rigid, solid flat surface. The panel has a thin form factor and is preferably lightweight to allow mounting in almost any desired location. The panel is also low cost.

In some applications, the transducer may be applied to the back of a micro-LED or OLED panel or display to produce stereo sound to accompany video programming. Because the disclosed technology is lightweight, the substrate does not require any cumbersome supporting structure, as is needed with electrodynamic speakers such as those including magnets and drivers. The present technology can be applied directly to a supporting substrate with adhesive.

In another implementation, any lightweight, rigid, panel of a desired size may be used to provide optimal performance. The present technology is designed to work effectively with panels fabricated from various materials, including ABS, acrylic, aluminum, steel, composite materials, plywood, foamboard, cardboard, and paper. All these panel materials may provide satisfactory results.

The flat panel speaker 200 includes a transducer 202 attached to a thin panel 204 using adhesive 206 near center of the transducer 200. Adhesive 206 may be in the form of can be double-sided tape. In one implementation, the adhesive 206 is attached off-center to the panel. When connected to a voltage source, the transducer 202 bends and transfers its inertial force to the panel 204, inducing vibration of the panel 204. In a loudspeaker application, the voltage source is an audio-modulated electrical signal, while in a haptic feedback application, the voltage source can be an AC sine signal.

The stiffeners 124, 126, shown in FIGS shown in FIGS. 1A and 1B, are among elements in the transducer 100 that have strong influence on dynamic behavior of the transducer 100. Material, thickness, and the amount of overlap between the stiffeners 124, 126 and the piezoelectric layers 102, 104 can be optimized using FEM (finite element method) simulation and DOE (design of experiments).

Figure 3:
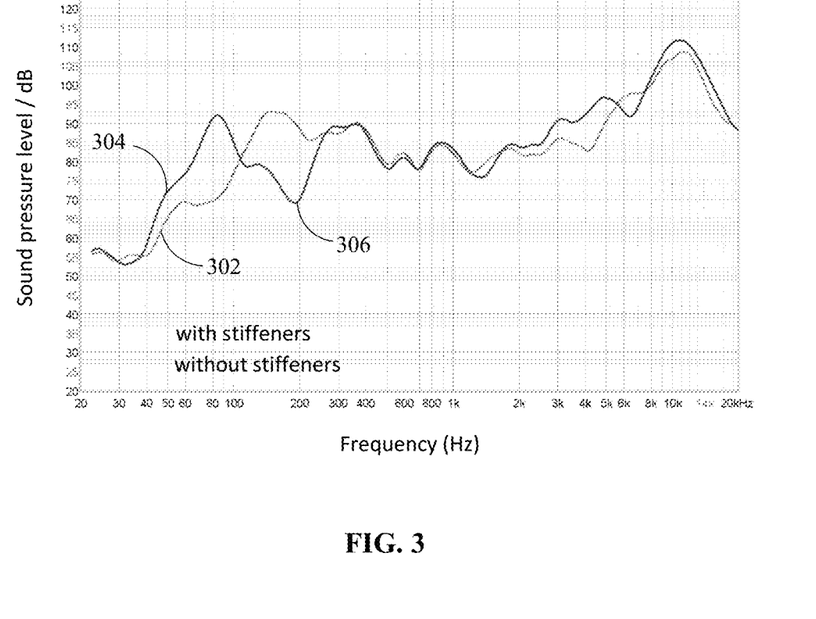
FIG. 3 is a graph showing comparison of frequency response of the transducer of FIG. 1A with and without the stiffeners.

FIG. 3 shows experimental result of frequency response curves of the panel speaker 200. As illustrated in FIG. 3, the curve 302 represents a panel excited by a transducer shown in FIG. 1A (with stiffeners 124, 126), while the curve 304 represents a panel excited by a transducer shown in FIG. 1A with the stiffeners 124, 126 removed (without the stiffeners). It can be observed that curve 304 has a dip 306 at approximately 190 Hz, while curve 302 is more uniform in the range of 100-250 Hz. This result demonstrates that adding stiffeners 124, 126 can completely remove the resonance associated with the transition area between the masses 120, 122 and the piezoelectric layers 102, 104, thus improving the sound quality in low-frequency range.

Similarly, the masses 120, 122 may be optimized to obtain the desired frequency response. Generally, heavier mass can help move the frequency response curve to the left, extending frequency response further into low frequency range.

Figure 2B:
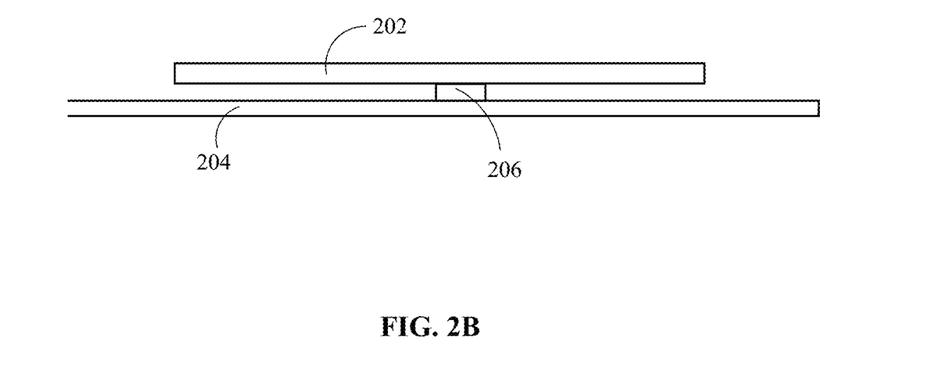
FIG. 2B is a bottom view of FIG. 2A.
Figure 4:
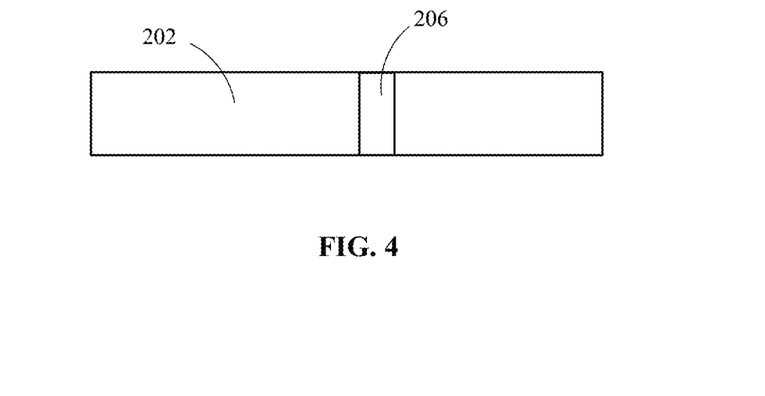
FIG. 4 is a bottom view of FIG. 2B without the panel.

FIG. 4 illustrates the bottom view of FIG. 2B without the panel 204. Typically, the adhesive 204 has a rectangle shape and covers the whole width (in vertical direction) of the transducer 202. With this configuration, frequency response of the panel 204 usually has large peaks and dips, due to resonance of the transducer 202.

In one implementation, to solve this problem, the present technology uses different slanted shapes for the adhesive 206 as shown in FIGS. 5A to 5I. All these shapes are arranged at an angle different from 90 degrees to the longer edge of the transducer 202. This allows them to span longer along the longer edge of the transducer 202 (in horizontal direction) compared to a rectangular one, as shown in FIG. 4, of the same area. This arrangement was found to help attenuate resonance, thus minimizing peaks and dips in frequency response. The angle and shape of the adhesive 206 can be optimized using DOE.

The optimal angle for the adhesive 206 preferably falls between 45 and 60 degrees. Some of the disclosed adhesive shapes do not cover the whole width of the transducer 202, for example, the ones illustrated in FIGS. 5B, 5D, and 5E. These implementations may have non-uniform cross-sections or irregular shapes as shown in FIGS. 5C, 5E, and 5G. They may comprise several discrete elements as shown in FIGS. 5D, 5H, 5J. These characteristics help improve the frequency response further.

Figure 5A:
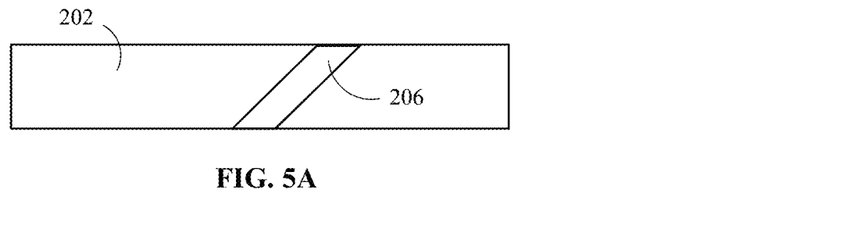
FIGS. 5A-5J illustrate examples of adhesive shapes for the transducer of FIG. 4.
Figure 5B:
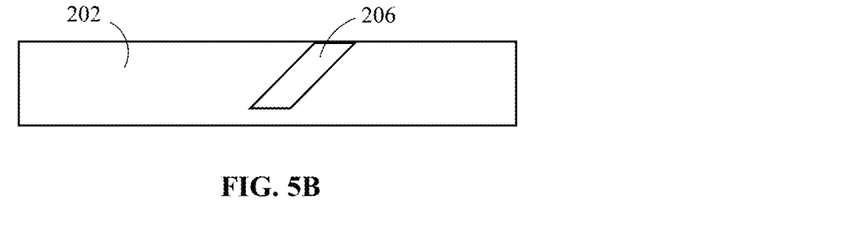
Figure 5C:
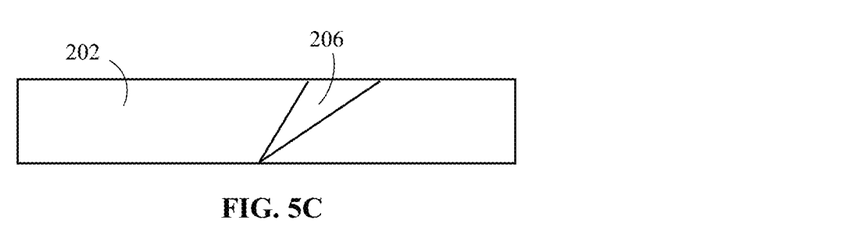
Figure 5D:
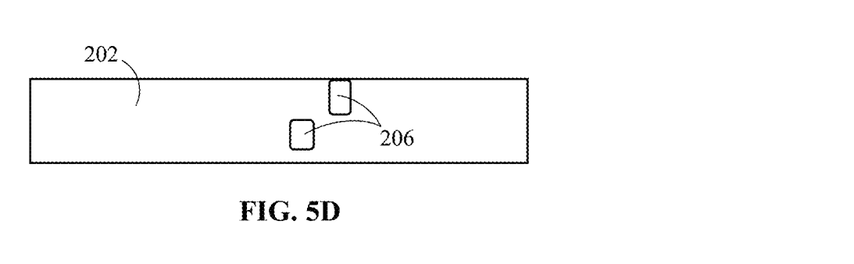
Figure 5E:
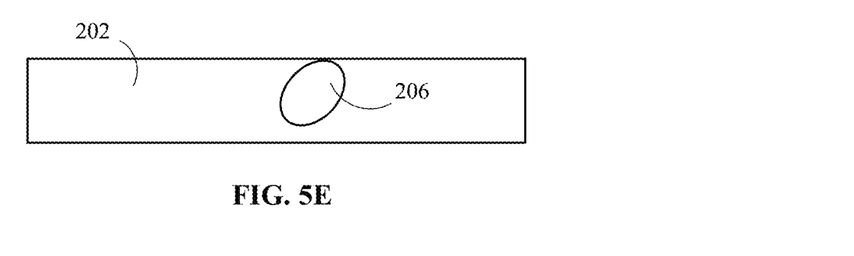
Figure 5F:
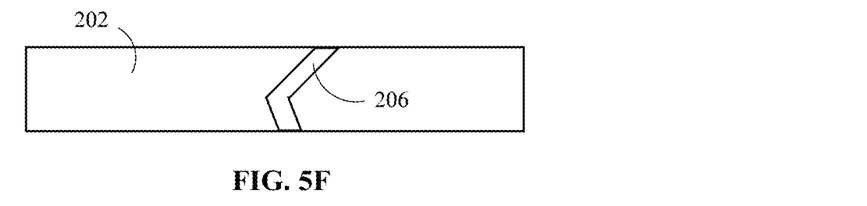
Figure 5G:
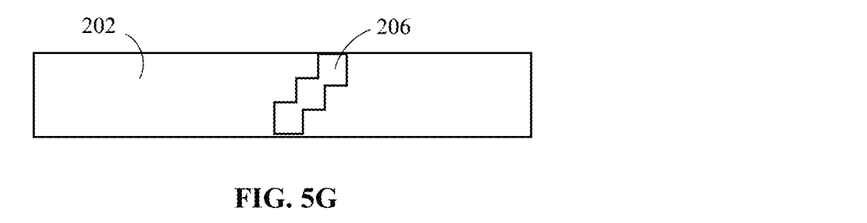
Figure 5H:
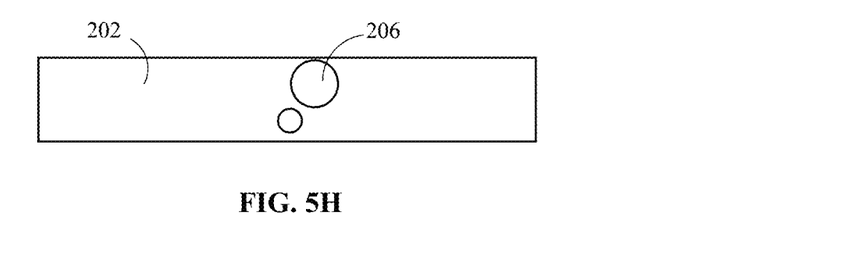
Figure 5I:
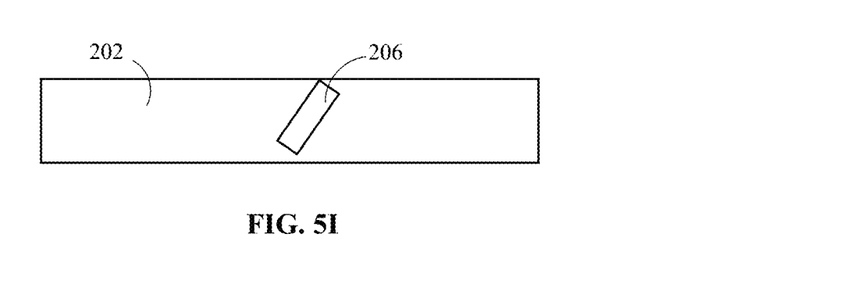
Figure 5J:
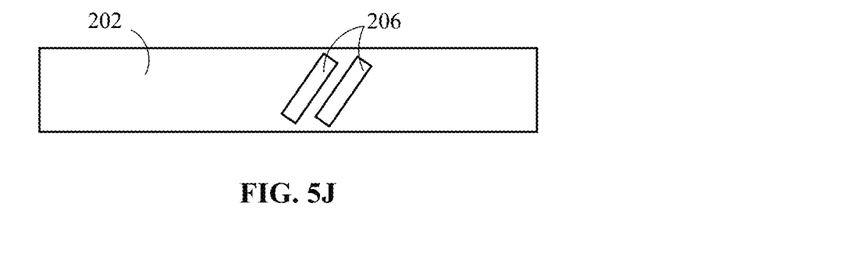
Figure 6:
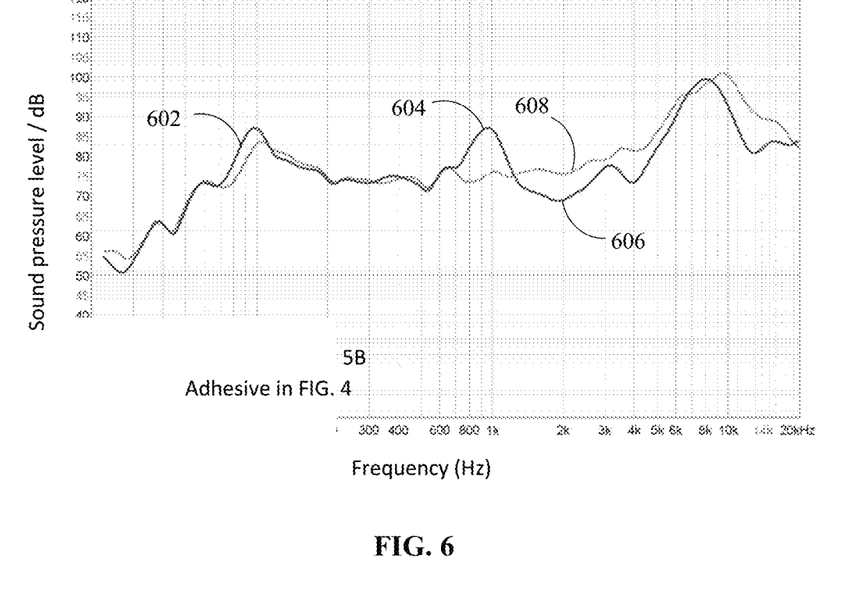
FIG. 6 shows comparison of frequency response between a rectangle adhesive of FIG. 4 and a proposed adhesive shape of FIG. 5C.

FIG. 6 shows an experimental result comparison of frequency response between typical adhesive shape of FIG. 4 and a proposed adhesive shape of FIG. 5B. The frequency response 602 of the adhesive in FIG. 4 has a peak 604 at approximately 1 kHz and a dip 606 at approximately 2 kHz, while the frequency response 608 of the adhesive in FIG. 5B is significantly more uniform in the frequency range between 700 Hz and 5 kHz. The adhesive shapes disclosed in the present technology improve the sound quality in the mid-frequency range.

Figure 7:
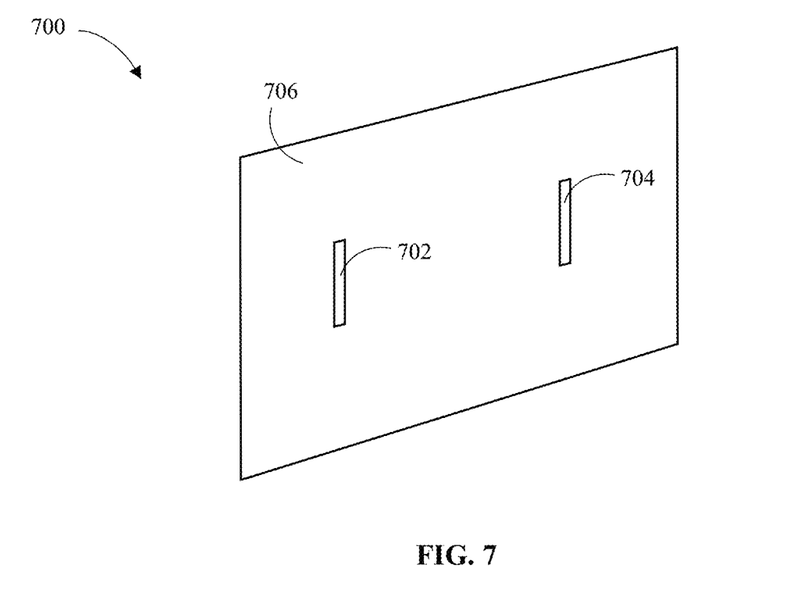
FIG. 7 is a perspective view of a flat panel speaker using the transducers of FIG. 1A.

FIG. 7 illustrates a flat panel speaker which uses the transducers illustrated in FIG. 1B.

The flat panel speaker 700 includes two transducers 702, 704 attached to a thin panel 706 using double-sided tape as illustrated in FIG. 5B. The transducer is preferably arranged horizontally, while the panel 700 is arranged vertically in its final use configuration, in an OLED display application, for example. In this orientation, when the double-sided tape is used as the mounting adhesive is installed off-center, there will be a permanent rotational moment applied to the double-sided tape proportional to the masses of the transducers 702, 704.

Under higher temperature conditions, the moment can induce rotation of the transducers 702, 704, resulting in creep deformation and failure of the double-sided tape. Creep deformation or tape creep may be defined as unwanted movement of the transducer along the panel 700 due to gravity effects and rotational momentum. To avoid this possible failure, the transducers 702, 704 are preferably installed vertically on the panel, as shown in FIG. 7. This vertical orientation helps to minimize the rotational moment applied to the double-sided tape and eliminates the possibility of creep deformation and failure of the double-sided tape. In higher temperature applications where creep deformation may still be a problem, alternative attachment methods may be used.

Since other modifications and changes in the material, shape, size, number of the parts, and arrangement of the parts will be apparent to those skilled in the art, it has to be understood that the technology disclosed is not considered limited to the above-described implementations of this technology disclosed, and covers all changes and modifications which do not constitute departures from the true spirit and scope of this technology disclosed.

What is claimed is:

1. A transducer, comprising:
   a substrate;
   two piezoelectric layers having a similar size to the substrate, the two piezoelectric layers attached to the two opposite surfaces of the substrate;
   four electrodes electrically connecting the two piezoelectric layers, the electrodes extending beyond the substrate; and
   two protective layers fully covering the piezoelectric layers;

whereby
when a voltage source is applied to the electrodes, two opposite electric fields are generated across the two piezoelectric layers, causing expansion or contraction of the piezoelectric layers, resulting in a bending motion of the transducer.

2. The transducer of claim 1, wherein the transducer is manufactured using a composite bagging process and autoclave curing.

3. The transducer of claim 1, wherein the two piezoelectric layers have the same polarization direction.

4. The transducer of claim 1, wherein the substrate and protective layers are glass fiber composite.

5. The transducer of claim 1, wherein the electrodes are copper foils.

6. A transducer, comprising:
a substrate;
two piezoelectric layers having a similar size to the substrate, each layer attached to an opposite surface of the substrate;
at least two electrodes electrically connecting the two piezoelectric layers;
two protective layers completely covering the piezoelectric layers; and
two stiffeners arranged at the two ends of the piezoelectric layers, the stiffeners overlapping the piezoelectric layers; whereby
when a voltage source is applied to the electrodes, two opposite electric fields are generated across the two piezoelectric layers causing expansion or contraction of the piezoelectric layers, resulting in bending motion of the transducer.

7. The transducer of claim 6, wherein the transducer is manufactured using a composite bagging process and autoclave curing.

8. The transducer of claim 6, wherein the piezoelectric layers have the same polarization direction.

9. The transducer of claim 6, wherein the stiffeners are a unidirectional carbon fiber composite.

10. The transducer of claim 9, further including two masses positioned at each end of the transducer.

11. The transducer of claim 9, wherein thickness and overlap between the stiffeners and the piezoelectric layers are optimized using DOE to minimize resonance.

* * * * *